(12) United States Patent
Gast et al.

(10) Patent No.: US 8,721,238 B2
(45) Date of Patent: May 13, 2014

(54) TOOL CLAMPING DEVICE

(75) Inventors: Stephan Gast, Schwabsoien (DE); Stefan Bonerz, Kaufbeuren (DE); Wolfgang Bechteler, Ebenhofen (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 1218 days.

(21) Appl. No.: 12/616,463

(22) Filed: Nov. 11, 2009

(65) Prior Publication Data
US 2010/0124468 A1 May 20, 2010

(30) Foreign Application Priority Data

Nov. 20, 2008 (DE) .......................... 10 2008 058 185

(51) Int. Cl.
*B23Q 17/22* (2006.01)
(52) U.S. Cl.
USPC .............................. 409/232; 409/233; 409/32
(58) Field of Classification Search
USPC .................. 409/32, 233, 186–188, 193–195, 409/207–209, 232; 408/239 R, 239 A
See application file for complete search history.

(56) References Cited

U.S. PATENT DOCUMENTS

| | | | |
|---|---|---|---|
| 5,655,422 A * | 8/1997 | Stolz et al. | .......... 82/1.2 |
| 6,726,415 B2 | 4/2004 | Jakob et al. | |
| 7,217,230 B2 | 5/2007 | Hyun | |
| 7,320,567 B2 | 1/2008 | Greif et al. | |
| 7,393,165 B2 | 7/2008 | Greif et al. | |
| 7,393,311 B1 | 7/2008 | Giovanelli et al. | |
| 2006/0239788 A1 | 10/2006 | Hyun | |
| 2008/0159822 A1 | 7/2008 | Giovanelli et al. | |

FOREIGN PATENT DOCUMENTS

| | | |
|---|---|---|
| DE | 2952636 A1 | 10/1980 |
| DE | 10043006 C1 | 4/2002 |
| DE | 10 2004 051 031 B3 | 4/2006 |
| DE | 112004001389 B4 | 1/2010 |
| EP | 1938922 A1 | 7/2008 |
| JP | 4008454 | 1/1992 |
| JP | 2004008454 A | 1/2004 |

OTHER PUBLICATIONS

European Search Report dated May 21, 2010 for EP09173157.

* cited by examiner

*Primary Examiner* — David Bryant
*Assistant Examiner* — Christopher Besler
(74) *Attorney, Agent, or Firm* — Fleit Gibbons Gutman Bongini & Bianco PL; Martin Fleit; Paul D. Bianco

(57) ABSTRACT

In the case of a tool clamping device, in particular, for an operating spindle of a processing machine, with an activation element (3) that can be moved by a drive between a first position, in which the tool clamping device is located in a clamped position, and a second position, in which the tool clamping device is located in a released position, a sensor is present in the form of at least one electrical component for detecting a position of the activation element (3). The sensor is integrated structurally into the tool clamping device and at least one section of the activation element (3) directly forms a component of the one or more electrical components, wherein its position influences an electrical property of this component. The component can be an electrical switch whose closed state depends on the position of the activation element (3) in that at least one section of the activation element (3) is electrically conductive and forms a contact electrode of the switch or a part of such an electrode. However, it could also be a capacitor or an inductor.

20 Claims, 5 Drawing Sheets

TOOL CLAMPING DEVICE

CROSS REFERENCE TO RELATED APPLICATION

This application claims priority under 35 U.S.C. §119 to German Patent Application No. 10 2008 058 185.2 filed Nov. 20, 2008, the entire contents of which are incorporated herein by reference.

FIELD OF THE INVENTION

The invention relates to a tool clamping device.

BACKGROUND OF THE INVENTION

DE 100 43 006 C1 teaches a device. Here an assembly of plate springs provides a tensile force for clamping a tool or tool holder in a tool mount through a set of collet chuck segments. The tool is released by an axial displacement of a so-called drawbar on which, for this purpose, a corresponding counter force must be applied. This counter force is applied as a compressive force by means of a piston driven hydraulically or pneumatically onto the end face of the drawbar facing away from the tool mount. The piston is therefore designated as a tool release piston. As an alternative, in DE 10 2004 051 031 B3, the use of an electric drive was also proposed for displacing the tool release piston.

For clamping a tool, the tool release piston is moved from its active position, in which it deflects the drawbar against the force of the plate-spring assembly and therefore sets the tool clamping device in the released position, into its inactive position, in which it is not in contact with the drawbar. Because the drawbar rotates during the operation of the operating spindle whose component is the tool clamping device, while the tool release piston stands still, when the operating spindle starts up, there is no longer contact between the drawbar and the tool release piston. In order to guarantee this, after the issuing of the corresponding command by the control unit of the processing machine, a specified time span must elapse before the operating spindle can be started. This time span can last, for a maximum, during the disengagement movement of the tool release piston from the drawbar. This means a certain delay in the work cycle of the processing machine.

In the case of an incorrect function in the form of a disengagement movement of the tool release piston from the drawbar that is too slow or incomplete due to incorrect pressure ratios in the case of a hydraulic or pneumatic drive of the piston or due to an incorrect cycle control by the control unit of the processing machine, the operating spindle may start even though the tool release piston is still in contact with the drawbar. In the extreme case, this can lead to frictional fusing of the tool release piston with the drawbar at the respective pressure contact faces, i.e., to damage to the tool clamping device.

SUMMARY OF THE INVENTION

In consideration of this state of the art, the problem of the present invention is to improve the functional reliability of a tool clamping device according to the invention and to accelerate the cycle of a tool exchange.

This problem is solved according to the invention by a tool clamping device as set forth in the claims. Advantageous configurations of the invention are specified in the subordinate claims.

According to the invention, the position of the tool release piston is detected by a sensor that is integrated structurally into the tool clamping device. This measure solves the problem that a use of readily available position sensors for hydraulic or pneumatic cylinders is decisively prevented by the special spatial conditions of a tool clamping device specified for installation in an operating spindle, such as, in particular, the presence of a rotating lubricant feed. The function further provided according to the invention of the tool release piston as a direct component of an electrical component guarantees, on one hand, the functional reliability of the position detection and simplifies, on the other hand, the construction of the sensor. Advantageous effects of the invention include a reduction in unplanned spindle standstill times or a reliable cycle sequence during the tool exchange. In addition, through the feedback of the piston position, sequence optimizations are possible that can lead to a time gain for each completed part.

A first embodiment of the invention consists of an electrical switch in which the tool release piston closes an electrical contact through a mechanical contact with an end-face contact and here acts as a contact electrode or at least as part of such a contact electrode, that is, conducts the current flowing in the case of a closed switch.

A second embodiment of the invention consists of an electrical capacitive element in which a section of the tool release piston acts as a capacitor electrode due to its metallic conductivity. Through a cross-sectional change of the above section along the movement direction of the piston, a dependency of the electrode distance and thus of the capacitance value on the piston position can be achieved.

A third embodiment of the invention consists of an electrical inductive element in which a section of the tool release piston made, in this case, from ferromagnetic material, acts as a magnetic core. Through a cross-sectional change of the above section along the movement direction of the piston, a dependency of the distance between a coil and the magnetic core allocated to this coil and thus of the inductance value on the piston position can be achieved.

BRIEF DESCRIPTION OF THE FIGURES

The following description of embodiments with reference to the drawings discloses additional details and advantages of the invention. Shown in these drawings are.

DETAILED DESCRIPTION OF THE INVENTION

Figure 1:
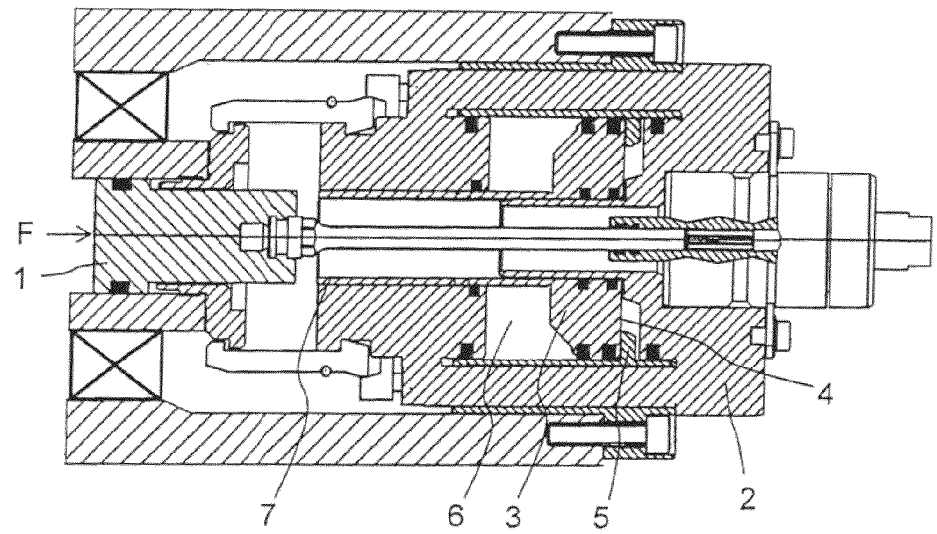
FIG. 1, a longitudinal section of a part of a tool clamping device in the clamped position, FIG. 2, a longitudinal section of the part of FIG. 1 in the released position, FIG. 3, a longitudinal section of a part of a tool clamping device equipped with a first embodiment of the invention in the clamped position, FIG. 4, a longitudinal section of the part of FIG. 3 in the released position, FIG. 5, detail X from FIG. 3 in enlarged representation, FIG. 6, an evaluation circuit for the first embodiment shown in FIGS. 3-5, FIG. 7, a longitudinal section of a part of a tool clamping device equipped with a second embodiment of the invention in the clamped position, FIG. 8, an evaluation circuit for the second embodiment shown in FIG. 6 [sic; 7], and FIG. 9, a longitudinal section of a part of a tool clamping device equipped with a third embodiment of the invention in the clamped position.
Figure 2:
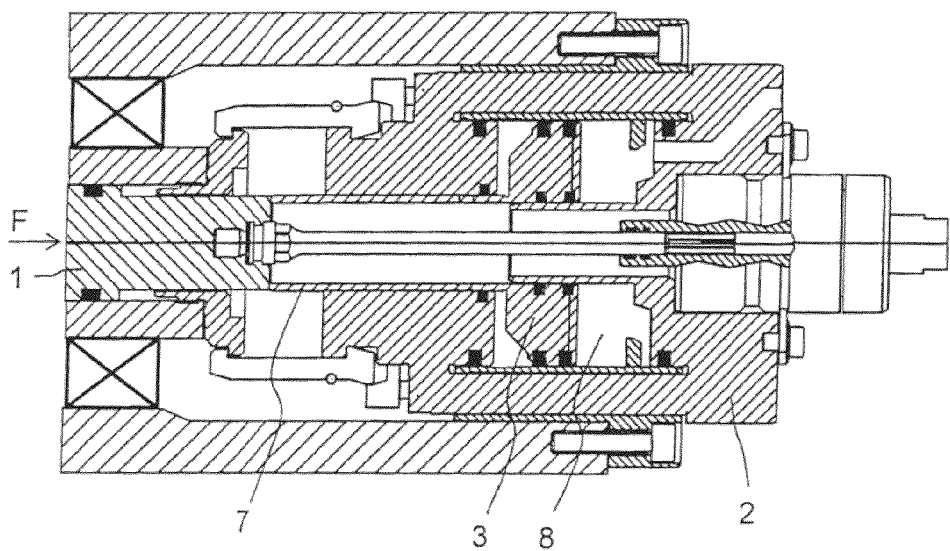

Initially, the basic function of a tool clamping device of the type forming the basis here with reference to FIGS. 1 and 2, each showing the part of such a device that is relevant for the present invention, shall be briefly explained with respect to the activation of the release of the tool from the tool mount. In the clamped position shown in FIG. 1, a not-shown plate-spring assembly exerts a force F on a drawbar 1 that is supported so that it can move and of which only the rear end facing away from the similarly not-shown tool mount is to be seen in FIGS. 1 and 2 and holds the drawbar 1 in the position shown in FIG. 1. A mechanical coupling between the drawbar 1 and the collet chuck segments of the tool holder provides, in this position, for the clamping of a tool or tool holder in the tool mount.

Axially adjacent to the end of the drawbar 1, there is a hydraulic cylinder 2 with an annular inner space in which an annular piston 3, the so-called tool release piston 3, is mounted so that it can move. The tool release piston 3 is located in the clamped position according to FIG. 1 on the rear end of its movement range and contacts a stop 5 with its rear end face 4. A front chamber 6 in the hydraulic cylinder 2 is filled, in this case, with a pressurized fluid and presses the tool release piston 3 against the stop 5. The tool release piston 3 has a hollow-cylinder-shaped section 7 that extends in the direction of the drawbar 1 and that has, however, in this position of the tool release piston 3, a distance from the rear end of the drawbar 1.

In the released position shown in FIG. 2, the tool release piston 3 is shifted relative to the clamped position of FIG. 1 in the axial direction against the drawbar 1 by filling a rear chamber 8 in the hydraulic cylinder 2 with a pressurized fluid, so that the front end of the hollow cylindrical section 7 of the tool release piston 3 is in contact with the rear end of the drawbar 1 and exerts a counter force on the drawbar 1, wherein this counter force is directed against the force F of the plate spring assembly. This drawbar is here shifted with respect to the clamped position of FIG. 1 in the axial direction, that is, in the representation of FIGS. 1 and 2, toward the left in the direction of the tool holder, wherein the collet chuck segments release the tool and the tool can be exchanged.

Because the drawbar 1 rotates during the operation of the operating spindle but the tool release piston 3, however, stands still, it is of interest to monitor the position of the tool release piston 3, in particular, to determine whether or not it is located in the end position according to FIG. 1 and thus at a distance from the drawbar 1. Reaching the above end position by the tool release piston 3 is a reliable indicator of the presence of the clamped state in which the operating spindle can be restarted again after a tool exchange.

Figure 3:
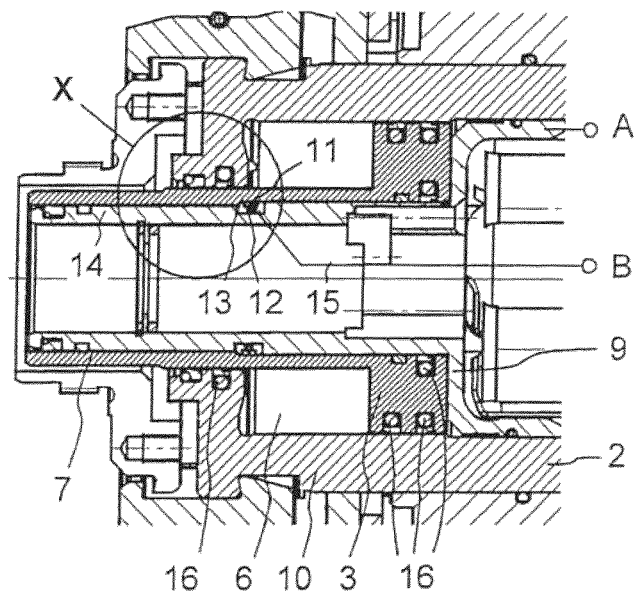

A first embodiment of a tool clamping device according to the invention with a sensor for detecting the position of the tool release piston is explained below with reference to FIGS. 3 to 5. Here, FIG. 3 shows, like FIG. 1 before, a cutout from a tool clamping device of the type forming the basis here. However, relative to FIG. 1, a few components, among these, in particular, the drawbar 1, are left out and therefore the remaining components are shown in detail. According to the invention, the tool release piston 3 functions as a component of an electrical switch, as described below. For forming this switch, the rear wall 9 of the cylinder 2 is contacted electrically and guided to an external connection terminal A. The rear wall 9 of the cylinder 2 is here, in contrast to the schematic diagram of FIG. 1, a part that is separate from the side wall 10, because the cylinder 2 must be open on one side for inserting the tool release piston 3.

Figure 4:
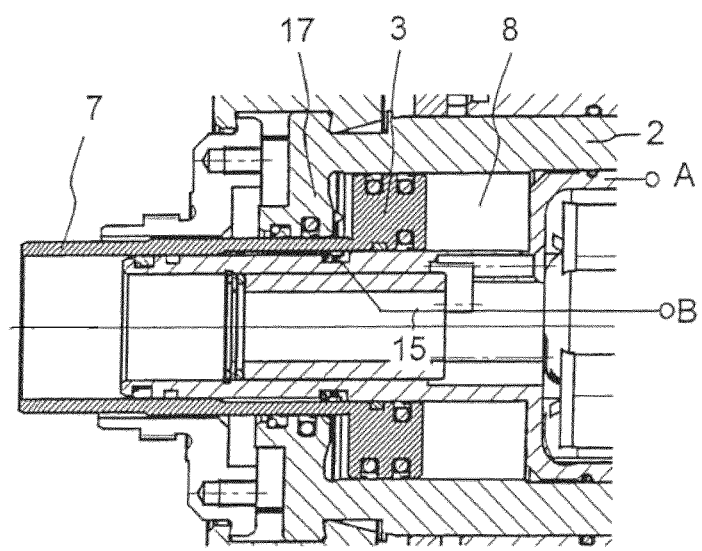
Figure 5:
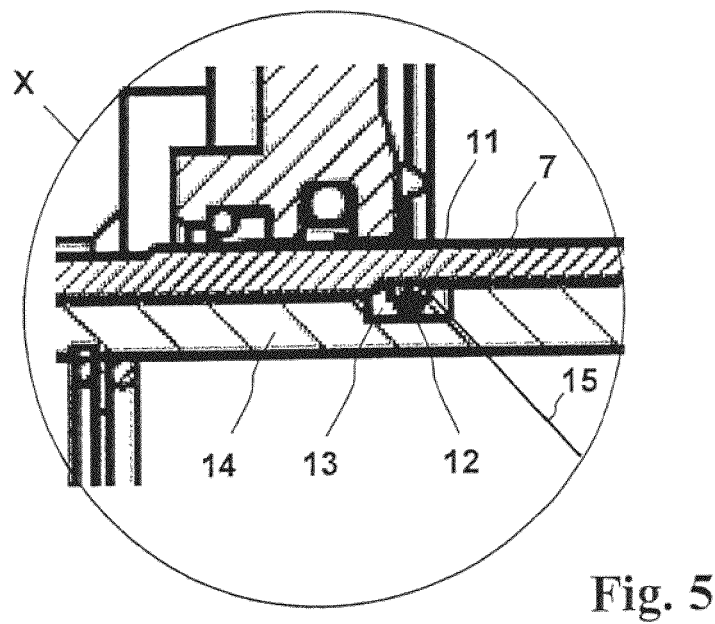

The tool release piston 3 is electrically contacted in the region of its hollow-cylindrical section 7 projecting in the direction of the drawbar, i.e., in the diagram of FIGS. 3 and 4, horizontally toward the left by a metallic slip ring 11. This slip ring 11 is supported by means of an elastic insulation ring 12, for example, an O-ring made from insulating material, within a ring-shaped groove 13 that is formed in a similarly hollow-cylinder-shaped guide body 14 lying coaxial to the section 7 and guiding this section in its movement. The guide body 14 is here, in contrast to the schematic diagram of FIG. 1, a separate part, but it is connected to the rear wall 9. The slip ring 11 is electrically insulated from the guide body 14 by the insulating ring 12. The insulating ring 12 furthermore exerts a radially outward directed force onto the slip ring 11 and presses it from the inside against the section 7 of the tool release piston 3. From the slip ring 11, an insulated line 15 leads to an external connection terminal B. For illustration, the cutout characterized in FIG. 3 with the letter X is shown enlarged in FIG. 5.

The mechanical contact of the tool release piston 3 with the rear wall 9 of the cylinder 2 in the end position shown in FIG. 3 simultaneously creates an electrical contact between these two metallic, conductive components, wherein, overall, an electrical connection between the connection terminals A and B is produced by means of the hollow-cylindrical section 7, the slip ring 11, and the line 15, if the tool release piston 3 is located in the right end position shown in FIG. 3 in which it reliably has no mechanical contact with the drawbar and consequently the tool clamping device must be located in the clamped state. As soon as the tool release piston 3 is distanced from the rear wall 9 of the cylinder 2, the electrical contact and thus the conductive connection between the connection terminals A and B is broken.

Thus, a position sensor is present in the form of an electrical switch whose closed state reliably indicates the right end position of the tool release piston 3 and thus the clamped position of the tool clamping device. The special reliability of this indication touches upon the fact that the tool release piston 3 forms an integral component of the switch in which it directly represents a contact electrode of the switch and conducts current when the switch is closed.

A prerequisite for the function of the sensor is that the electrical contact between the tool release piston 3 and the cylinder 2 can be closed only at the rear wall 9 of the cylinder 2. In the case of a hydraulic or pneumatic drive of the annular or hollow-cylindrical-shaped tool release piston 3, several elastic sealing rings 16 are present on its inner and outer lateral surfaces in order to create the seal necessary for the function of the drive. Such a seal is required both between the two annular chambers 6 (FIGS. 3) and 8 (FIG. 4) defined by the position of the tool release piston 3 within the cylinder 2 and also in the region of the hollow-cylindrical section 7 between the front annular chamber 6 and the surroundings. Another function of the sealing rings consists in the sliding support of the tool release piston 3 in the cylinder 2.

The sealing rings 16 are made from insulating material and thus simultaneously create electrical insulation of the tool release piston 3 relative to the cylinder 2 and also relative to the guide body 14 that is connected mechanically and therefore also electrically to the rear wall 9 of the cylinder 2. In addition to the sealing rings 16 required for the function of the drive, that is, for the sealing, additional insulation rings can be provided at suitable positions, for example, in the front region of the hollow-cylindrical section 7 and the guide body 14, in order to reliably prevent electrically conductive contact of the section 7 in the region of its inner and outer lateral surfaces with the cylinder 2. It is understood that the medium for driving the tool release piston 3 must be non-conductive in each case in this embodiment of the invention.

FIG. 4 shows the section from a tool clamping device from FIG. 3 with the tool release piston 3 in its other end position in which it is shifted as far as possible to the front, i.e., toward the left in the representation of FIGS. 3 and 4, and in which the hollow-cylindrical section 7 deflects the not-shown drawbar for releasing the tool clamping device. This position of the tool release piston 3 corresponds to the released position shown in FIG. 2. As is visible from FIG. 4, the tool release piston 3 does not touch the front wall 17 of the cylinder 2 in this position, but instead it still has a certain distance from it, so that, in this end position, in contrast to the other position, there is no electrical contact between the tool release piston 3 and the cylinder 2 and consequently there is no conductive connection between the connection terminals A and B. This is achieved by a mechanical stop that limits the movement range of the drawbar 1 and thus also the tool release piston 3 in the direction of the tool mount, i.e., toward the left in FIG. 4. Through a suitable measure, such as, for example, the arrangement of an insulating disk on the rear end of the drawbar, en electrical contact between the tool release piston 3 and the drawbar must be prevented if the drawbar is not supported on its side such that it is electrically insulated from the cylinder 2.

Figure 6:
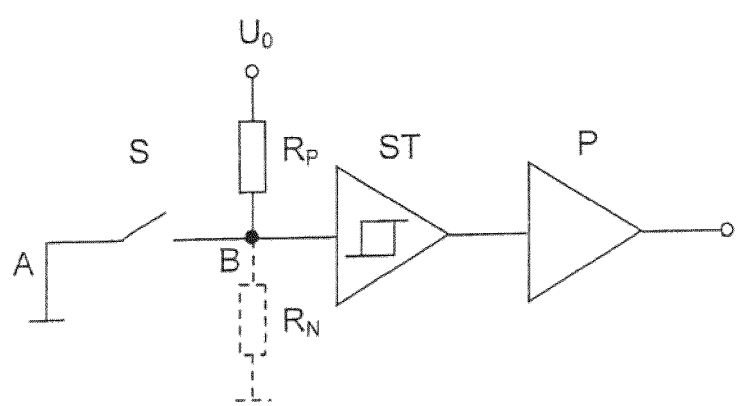

As FIG. 6 shows, the evaluation of the switch position can be performed in a simple way by connecting the input of a Schmitt trigger ST and a pull-up resistor $R_P$ to the power-supply voltage $U_0$ of the evaluation electronics at the connection terminal B. The connection terminal A is connected via the cylinder 2 to the whole, remaining metallic tool clamping device and via the operating spindle in which the tool clamping device is installed to the ground of the processing machine. This means that, for an opened switch S, through the pull-up resistor $R_P$, the connection terminal B lies at the power-supply voltage $U_0$ of the evaluation electronics and for a closed switch S at the ground of the processing machine, as long as the resistor $R_N$ shown with dashed lines is not at ground, which will be discussed below. Thus, the switch S does not float, but instead always switches to ground when closed. Through the Schmitt trigger ST and its input capacitance, the switch S is debounced and a digital output signal is provided that can be fed to the machine controller for processing. Here, a level converter P can also be provided after the Schmitt trigger ST.

Due to wear and contamination in the case of long-term operation, the insulation effect of the sealing rings 16 and/or additional insulation rings can degrade and a certain electrical conductivity between the tool release piston 3 and the cylinder 2 can be produced, even if the tool release piston 3 is not in contact with the rear wall 9 of the cylinder 2. Such conductivity is tolerable for the function of the position sensor according to the invention if the connection between the tool release piston 3 and the cylinder 2 is at least high impedance apart from the contact position on the rear wall 9 of the cylinder 2, so that reaching the contact position can still be reliably detected.

In the case of the evaluation circuit according to FIG. 6 with a Schmitt trigger ST and a pull-up resistor $R_P$ to the power-supply voltage $U_0$ at the connection terminal B, this means that the resistor $R_N$ resulting from incomplete insulation between the tool release piston 3 and the cylinder 2 and shown with dashed lines in FIG. 6 between the connection terminal B and ground forms a voltage divider together with the pull-up resistor $R_P$ and the connection terminal B is thus not pulled by the pull-up resistor $R_P$ to the power-supply voltage $U_0$ apart from the contact position of the tool release piston 3, i.e., for an open switch S, but instead lies at a lower voltage determined by the divider ratio of $R_P$ and $R_N$. This voltage must still lie sufficiently far above the switching threshold of the Schmitt trigger ST, so that this reliably switches over when the switch S is closed. Whether a certain value of $R_N$ is sufficiently high impedance depends, in the circuit according to FIG. 6, on the divider ratio of the voltage divider formed by $R_P$ and $R_N$.

Figure 7:
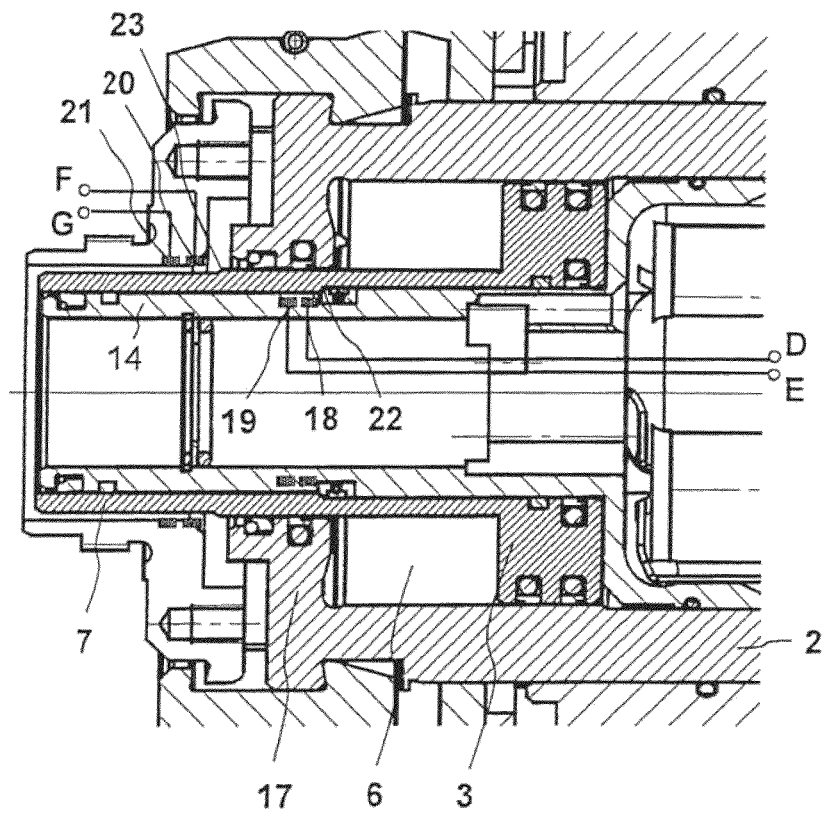

FIG. 7 schematically shows a second embodiment of the invention, wherein the partial view of a tool clamping device corresponds to that of FIG. 3, that is, represents the clamped position with the tool release piston 3 in its rear end position. As can be seen in FIG. 7, in the region of the hollow cylindrical section 7 of the tool release piston 3 projecting in the direction of the drawbar, both within and also outside the hollow cylinder, two annular capacitor electrodes 18 and 19 or 20 and 21 are arranged in the axial direction one next to the other and adjacent to each other, wherein there is a specified spacing in the axial direction between the two inner-lying electrodes 18 and 19 and the two outer lying electrodes 20 and 21.

The capacitor electrodes 18 to 21 are arranged similar to the insulation ring 12 of the first embodiment each in separately formed annular grooves that are not shown for the sake of simplicity in FIG. 7 and are necessarily electrically insulated relative to the guide body 14. As can be taken from FIG. 7, the hollow-cylindrical section 7 of the tool release piston 3 covers all of the capacitor electrodes 18 to 21 and thus forms a series circuit of two capacitors between the terminals D and E or F and G, respectively, guided insulated to the outside, on one side, with the two inner lying electrodes 18 and 19 and, on the other side, with the two outer lying electrodes 20 and 21.

As FIG. 7 further shows, the hollow cylindrical section 7 has two steps 22 and 23 offset relative to each other in the axial direction at which the cross section changes. The step 22 is located farther behind, i.e., in FIG. 7 to the right on the inside and the step 23 farther forward, i.e., in FIG. 7 to the left on the outside of the section 7. In this way, a greater thickness is produced between the two steps 22 and 23 than toward the right from the step 22 and toward the left from the step 23. The capacitor electrodes 18 to 21 are arranged relative to the steps 22 and 23 so that, for a displacement of the tool release piston in the axial direction, the rear step 22 moves past the inner electrodes 18 and 19 and the front step 23 moves past the outer electrodes 20 and 21, wherein the corresponding electrode spacings of the capacitors connected in series and thus the capacitance values change.

Through the orientation of the two steps 22 and 23, a displacement of the tool release piston 3 in the direction of the drawbar, that is, the movement into the released position, causes, on one hand, an increase in the electrode spacing and thus a decrease in the capacitance value of the inner capacitors with the electrodes 18 and 19, and on the other hand, a reduction in the electrode spacing and thus an increase in the capacitance value of the outside capacitors with the electrodes 20 and 21. A displacement of the tool release piston 3 in the opposite direction accordingly causes inverted capacitance-value changes.

Furthermore, the positions and also the axial spacing of the two steps 22 and 23 and the positions and also the axial spacing of the inside electrode pair 18, 19 and the outside electrode pair 20, 21 are tuned to each other, so that, for a displacement of the tool release piston 3 in the axial direction, the inside capacitance decreases with a simultaneous increase in the outer capacitance and vice versa. In addition, the mentioned spacings and positions are selected so that, in each of the two end positions of the tool release piston 3, one of the two electrode pairs 18, 19 or 20, 21 just reaches its minimum capacitance and the other just reaches its maximum capacitance.

In FIG. 7, the previously described dimensioning rules are expressed in that, in the rear end position of the tool release piston 3 shown there, the rear step 22 on the inside of the section 7 is located just to the right next to the inner electrode pair 18, 19 and the front step 23 on the outside of the section 7 is located just to the right next to the outer electrode pair 20, 21, wherein the total capacitance of the inner electrode pair 18, 19 between the terminals D and E just reaches its maximum value and that of the outer electrode pair 20, 21 between the terminals F and G just reaches its minimum value.

In the not-shown, front end position of the tool release piston 3, the rear step 22 on the inside of the section 7 would be located just to the left next to the inner electrode pair 18, 19 and the front step 23 on the outside of the section 7 would be located just to the left next to the outer electrode pair 20, 21, wherein the total capacitance of the inner electrode pair 18, 19 between the terminals D and E would just reach its minimum value and that of the outer electrode pair 20, 21 between the terminals F and G would just reach its maximum value. For this purpose, it is to be noted that the displacement path of the tool release piston 3 does not correspond to the total axial length of the front chamber 6 because the tool release piston 3, as explained above, does not contact the front wall 17 of the cylinder 2 in the front end position.

Therefore, a position sensor is present in the form of a capacitor arrangement with several capacitance values changing in opposite directions, wherein a set of extreme values of the capacitance values reliably indicates the presence of the rear end position of the tool release piston 3 and thus the clamping position of the tool clamping device. The special reliability of this indication involves the condition that a section 7 of the tool release piston 3 forms an integral component of the capacitance arrangement in the form of an electrode common to several capacitors.

Figure 8:
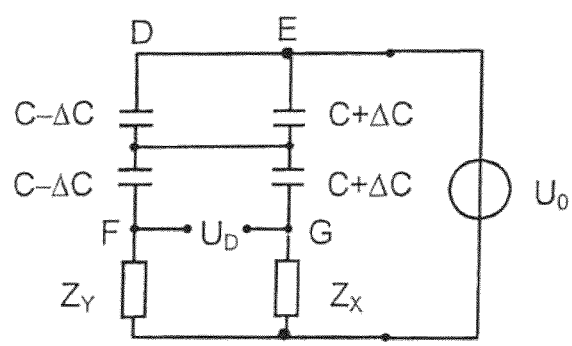

One special advantage of the arrangement of several capacitors described above in comparison with an individual capacitor is the better measurability of a capacitance change relative to large stray capacitances caused by the metallic surroundings. Offset and interference parameters therefore can be computationally eliminated to a certain extent. FIG. 8 shows a measurement circuit suitable for evaluation in the form of a bridge circuit. Here, the inside and the outside series circuit of capacitive elements are connected in parallel-to-each-other, non-diagonally-opposing bridge arms, in order to achieve a maximum possible effect on the diagonal voltage through simultaneous decrease and increase in the equal-sized capacitance values C by the same magnitude $\Delta C$.

Because the section 7 of the tool release piston 3 active as a capacitor electrode is metallic and conductive, there is a cross connection between the two capacitive bridge arms through which two of the capacitors are connected in parallel to each other and in series to the bridge. The basic configuration of a half bridge, however, is maintained. The connections D to G of the capacitors from FIG. 7 are designated accordingly in FIG. 8. With the capacitors, two suitable impedances $Z_X$ and $Z_Y$ are connected together, in order to obtain, overall, a bridge circuit.

Although the use of several capacitance values that can change in opposite directions through a movement of the tool release piston 3 and their connection together into a bridge appears especially advantageous, a movement of the tool release piston 3 can also be basically detected with reference to the measurement of a changing individual capacitance value, i.e., only the capacitance formed by the electrodes 18, 19 or 20, 21 and the section 7 of the tool release piston 3, or two separate measurements could be performed on two variable individual capacitors, without these having to be connected together into a bridge.

Figure 9:
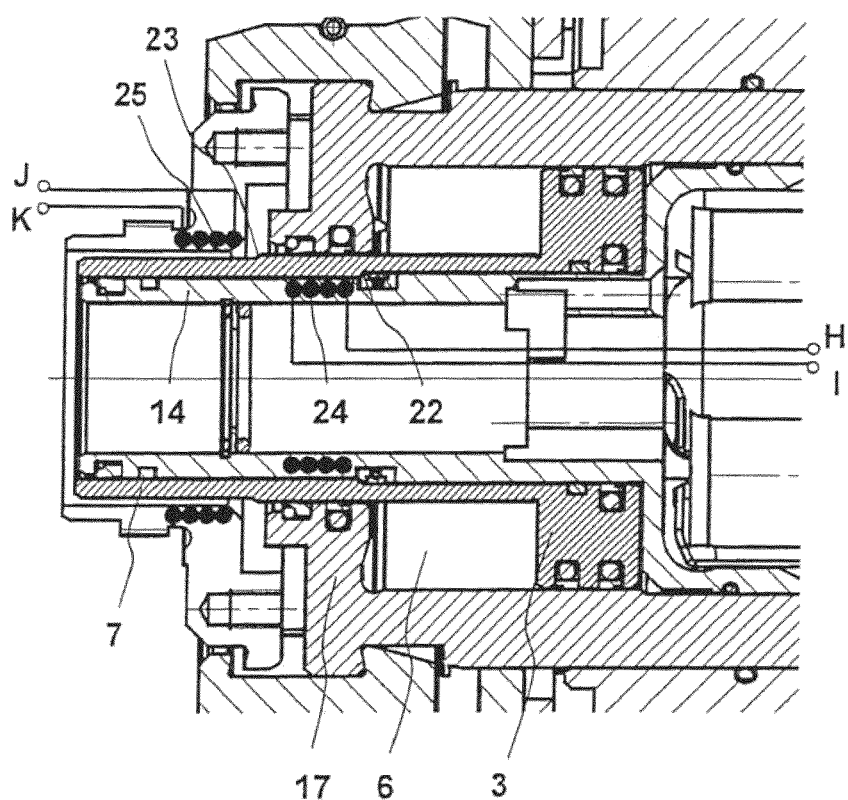

FIG. 9 schematically shows a third embodiment of the invention, wherein the partial view of a tool clamping device there similarly corresponds to that of FIG. 3, that is, represents the clamped position with the tool release piston 3 in its rear end position. As can be seen in FIG. 9, in the region of the hollow cylindrical section 7 of the tool release piston 3 projecting in the direction of the drawbar both within and also outside the hollow cylinder, a coil 24 or 25 is present at a specified mutual axial spacing.

The coils 24 and 25 are arranged just like the insulating ring 12 of the first embodiment in separately formed annular grooves that are not shown in FIG. 9 for the sake of simplicity. Through the use of highly permeable material as the coil body, i.e., covering the mentioned grooves with such material, penetration of the magnetic field into the surrounding material of the guide body 14 can be largely prevented in order to improve the intended measurement effect described below. As to be taken from FIG. 9, the hollow-cylindrical section 7 of the tool release piston 3 covers both coils 24 and 25 and forms a magnetic core for each of these coils, which assumes that it is made from a ferromagnetic material. The terminals of the coils are guided insulated from the outside and designated with H and I or J and K.

As FIG. 9 further shows, the hollow-cylindrical section 7 has two steps 22 and 23 offset relative to each other in the axial direction, just as in the second embodiment, at which the cross section changes. The step 22 is located farther toward the rear, i.e., in FIG. 9 to the right on the inside and the step 23 farther toward the front, i.e., in FIG. 9 to the left on the outside of the section 7. In this way, a larger thickness is produced between the two steps 22 and 23 than to the right from the step 22 and to the left from the step 23. The coils 24 and 25 are arranged relative to the steps 22 and 23 so that, for a displacement of the tool release piston 3 in the axial direction, the rear step 22 moves past the inside coil 24 and the front step 23 moves past the outside coil 25, wherein the respective inductance values change.

Through the orientation of the two steps 22 and 23, a displacement of the tool release piston 3 in the direction of the drawbar, that is, the movement into the released position, causes, on one hand, an increase in the spacing of the section 7 active as a magnetic core from the inside coil 24 and thus a decrease in inductance, on the other hand, a reduction in the spacing of the section 7 active as a magnetic core from the outside coil 25 and thus an increase in inductance. A displacement of the tool release piston 3 in the opposite direction causes correspondingly inverted inductance-value changes.

Furthermore, the positions and also the axial spacing of the two steps 22 and 23 and the positions and also the axial spacing of the inside coil 24 and the outside coil 25 are tuned to each other so that, for a displacement of the tool release piston 3 in the axial direction, a decrease in the inside inductance with a simultaneous increase in the outside inductance is generated and vice versa. In addition, the mentioned spacings and positions are selected so that in each of the two end positions of the tool release piston 3, one of the two coils 24 or 25 just reaches its minimum inductance and the other just reaches its maximum inductance.

In FIG. 9, the dimensioning rules described above are expressed in that, in the rear end position of the tool release piston 3 shown there, the rear step 22 on the inside of the section 7 is located just to the right next to the inner coil 24 and the front step 23 on the outside of the section 7 is located just to the right next to the outer coil 25, wherein the inductance of the inner coil 24 just reaches its maximum value and that of the outer coil just reaches its minimum value.

In the not-shown front end position of the tool release piston 3, the rear step 22 on the inside of the section 7 would be located just to the left next to the inner coil 24 and the front step 23 on the outside of the section 7 would be located just to the left next to the outer coil 25, wherein the inductance of the inner coil 24 would just reach its minimum value and that of the outer coil 25 would just reach its maximum value. For this purpose it is to be noted, in turn, that the displacement path of the tool release piston 3 does not correspond to the total axial length of the front chamber 6 because the tool release piston 3, as mentioned before, does not contact the front wall 17 of the cylinder 2 in the front end position.

Thus, a position sensor is present in the form of an inductor arrangement with several inductors that can change in opposite directions, wherein a set of extreme values of the inductors reliably indicates the presence of the rear end position of the tool release piston 3 and thus the clamped position of the tool clamping device. The special reliability of this indication involves the condition that a section 7 of the tool release piston 3 forms an integral component of the inductor arrangement in the form of a magnetic core common to several coils.

One special advantage of the previously described arrangement of several coils in comparison with an individual coil is the better measurability of an inductance change relative to large stray inductances caused by the surroundings with ferromagnetic metal. Offset and interference parameters can therefore be computationally eliminated to a certain extent. For evaluation, in this embodiment, a measurement circuit is similarly especially suitable in the form of a bridge circuit with a circuit analogous to FIG. 8 of the inner and outer inductors in parallel-to-each-other, non-diagonally-opposing bridge arms, in order to achieve a maximum possible effect on the diagonal voltage through simultaneous decrease and increase in equal-sized inductance values L by an equal magnitude $\Delta L$. Because the section 7 of the tool release piston 3 acting as a magnetic core covers both coils 24 and 25, in this case there is a counter-inductance between the two inductive bridge arms, which is optionally to be taken into consideration in the design of the circuit. However, operation is also possible here basically with only a single measurement inductor or separate measurements could be performed on two variable individual inductors.

From the preceding description, for someone skilled in the art, a series of possible variants emerges for realizing the invention. For example, in the first embodiment, the activation element could form a contact instead of by means of a slip ring, also by means of a flexible and loop-shaped guided line at a fixed point, as long as for such a line a sufficient movement space can be made available for the movement. Furthermore, on the rear wall of the cylinder or on the end face of the tool release piston, a spring body could be attached, in order to define a certain contact point. In this case, the cylinder or the tool release piston would no longer provide the contact surface itself, but would still be a component of the electrode. In the second and third embodiment, in principle, a single capacitor or inductor would be sufficient for detecting the rear end position of interest in the activation element, although then, due to stray capacitance or inductance that is present, a significantly larger expenditure with respect to circuitry would be required. Such modifications and comparable modifications lie at the discretion of someone skilled in the art and should be covered by the protection of the claims.

Accordingly, although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A tool clamping device for a work spindle of a machine tool, comprising:
   an actuating member, positioned within the tool clamping device, which is displaceable between a first position in which the tool clamping device is in a clamping position and a second position in which the tool clamping device is in a releasing position;
   a sensor, disposed within the tool clamping device for detecting an axial position of the actuating member, the sensor
   including a capacitive element whose value depends on an axial position of the actuating member;
   at least one portion of the actuating member is electrically conductive and forms at least one electrode of the capacitive element; and
   the capacitive element further includes two annular and mutually coaxial electrodes arranged next to one another in an axial direction and having external terminals, wherein an annular and electrically conducting portion of the actuating member covers the two electrodes coaxially and thereby forms with these two electrodes a series circuit of two capacitors, and wherein a cross section of the electrically conductive portion of the actuating member covering the two electrodes varies in the axial direction so that the capacitance value depends on the axial position of the electrically conductive portion of the actuating member.

2. The tool clamping device according to claim 1, further including a second series circuit of two capacitors, the two series circuits-being spaced apart from each other in the axial direction and each series circuit having two capacitive elements, wherein the axial variation in the cross section of the electrically conductive portion of the actuating member covering the electrodes has a profile configured, in the first position to cause the total capacitance of one series circuit to have a greater value and is configured in the second position to cause the total capacitance of the other series circuit to have the greater value.

3. The tool clamping device according to claim 2, wherein the electrically conductive portion of the actuating member is a hollow cylinder having an interior surface and an exterior surface, and wherein a variation of the cross section takes place between a first step and a second step, the first step and the second step are offset relative to one another in the axial direction, and wherein at least one of the first step and the second step is disposed on one of the interior surface of the hollow cylinder and the exterior surface of the hollow cylinder, and the other of the first step and the second step is disposed on the other of the interior surface of the hollow cylinder and the exterior surface of the hollow cylinder.

4. The tool clamping device according to claim 3, wherein the two series circuits of capacitive elements are arranged in two branches of a bridge circuit, the two series circuits being connected in parallel relative to each other, and wherein the variation of the cross section of the electrically conductive portion of the actuating member covering the electrodes is configured to decrease the capacitance value of one of the two series circuits while simultaneously increasing the capacitive value of the other of the two series circuits.

5. The tool clamping device according to claim 2, wherein the two series circuits of capacitive elements are arranged in two branches of a bridge circuit, the two series circuits being connected parallel to one another, wherein the variation of the cross section of the electrically conductive portion of the actuating member covering the electrodes is configured to decrease the capacitance value of one of the two of the series circuit while simultaneously increasing the capacitive value of the other of the two of the series circuit.

6. Tool clamping device according to claim 1, wherein the component is at least one electrical inductive element whose value depends on the position of the activation element and in that at least one section of the activation element is ferromagnetic and forms at least one magnetic core of the inductive element.

7. Tool clamping device according to claim 6, wherein the inductive element has the shape of a cylindrical coil, in that a cylindrical or hollow-cylindrical, ferromagnetic section of the activation element covers the coil coaxially, and in that the cross section of the section of the activation element covering the coil varies in the axial direction, so that the inductance value depends on the axial position of the section.

8. Tool clamping device according to claim 6, wherein the inductive element has the shape of a cylindrical coil, in that a cylindrical or hollow-cylindrical, ferromagnetic section of the activation element covers the coil coaxially, and in that the cross section of the section of the activation element covering the coil varies in the axial direction, so that the inductance value depends on the axial position of the section.

9. Tool clamping device according to claim 6, wherein the inductive element has the shape of a cylindrical coil, in that a cylindrical or hollow-cylindrical, ferromagnetic section of the activation element covers the coil coaxially, and in that the cross section of the section of the activation element covering the coil varies in the axial direction, so that the inductance value depends on the axial position of the section.

10. Tool clamping device according to claim 6, wherein the inductive element has the shape of a cylindrical coil, in that a cylindrical or hollow-cylindrical, ferromagnetic section of the activation element covers the coil coaxially, and in that the cross section of the section of the activation element covering the coil varies in the axial direction, so that the inductance value depends on the axial position of the section.

11. Tool clamping device according to claim 8, wherein the two inductors are arranged in two parallel-to-each-other, non-diagonally-opposing arms of a bridge circuit, and in that the variation in the cross section of the section of the activation element covering the electrodes has a profile with respect to the two coils so that, for a movement of the activation element, one of the two inductances increases and the other decreases always at the same time.

12. A clamping device, comprising:
a clamping member;
an actuating member disposed within the clamping device, the actuating member configured to drive the clamping member between a clamping position and a releasing position by being axially displaced; and
a sensor system disposed within the clamping device for monitoring an axial position of the actuating member, the sensor system including:
a capacitive element having at least two electrodes disposed within the clamping device; and
an electrically conductive portion of the actuating member positionable to cover the electrodes, when the actuating member is moved axially, to create an electrical effect between at least two of the at least two electrodes, the capacitance value of the capacitive element dependent upon on the axial position of the electrically conductive portion of the actuating member.

13. The clamping device of claim 12, wherein two of the at least two electrodes of the capacitive element are arranged next to one another in an axial direction within the clamping device, and wherein when the electrically conductive portion of the actuating member is axially moved to cover the two electrodes coaxially, a series circuit of two capacitors is formed, and wherein a cross section of the electrically conductive portion that is axially movable to cover the two electrodes varies in the axial direction so that the capacitance value depends on the axial position of the electrically conductive portion.

14. The clamping device of claim 12, wherein a second series circuit of two capacitors is provided, the second series having electrodes that are spaced apart from the electrodes of the other series circuit of two electrodes along the axial direction of movement of the actuating member, and wherein when the axial variation in the cross section of the electrically conductive portion is axially moved to cover the electrodes of one of the two series circuits, a total capacitance of the covered series circuit has a greater value in the clamping position and a total capacitance of the other of the two series circuits has a greater value in the releasing position.

15. The clamping device of claim 12, wherein the electrically conductive portion of the actuating member includes a hollow cylinder, the hollow cylinder having an interior surface and an exterior surface, and wherein the variation of the cross section takes place between a first step and a second step, the first step and second step configured to be offset relative to one another in the axial direction of movement of the actuating member, at least one of the first step and the second step disposed on one of the interior surface of the hollow cylinder and the exterior surface of the hollow cylinder and the other of the first step and the second step disposed on the other of the interior surface of the hollow cylinder and the exterior surface of the hollow cylinder.

16. The clamping device of claim 15, wherein one of the two of the series circuit and the other of the two of the series circuit are arranged in two branches of a bridge circuit, the two of the series circuit are connected parallel to one another, wherein the variation of the cross section of the electrically conductive portion that is axially movable to cover the electrodes is configured to decrease the capacitance value of one of the two of the series circuit while increasing the capacitance value of the other of the two of the series circuit.

17. The clamping device of claim 12, wherein the actuating member is a cylinder guide.

18. A clamping device, for a spindle of a machine tool, comprising:
a clamping member;
an actuating member disposed within the clamping device, the actuating member configured to drive the clamping member between a clamping position and a releasing position by being axially displaced along the rotational axis of the spindle; and
a sensor system disposed within the clamping device for monitoring an axial position of the actuating member, the sensor system including:
a capacitive element having electrodes; and
a raised portion of the actuating member having an electrically conductive surface, wherein a capacitance value of the capacitive element depends on the axial position of the raised portion of the actuating member relative to the electrodes, the raised portion of the actuating member causing an increase or decrease in a spacing between the raised portion and the electrodes as the actuating member is axially displaced.

19. The clamping device of claim 18, wherein the electrodes includes two annular electrodes arranged next to one another along an axial direction of movement of the actuating member.

20. The clamping device of 18, wherein the actuating member is a hollow cylinder having an interior surface and an exterior surface, and the raised portion is formed by an enlarged diameter of the hollow cylinder, wherein the variation of the cross section is positioned between a first step and a second step, the first step and second step are offset relative to one another in the axial direction of movement of the actuating member, and wherein at least one of the first step and the second step is disposed on one of the interior surface of the hollow cylinder and the exterior surface of the hollow cylinder and the other of the first step and the second step is disposed on the other of the interior surface of the hollow cylinder and the exterior surface of the hollow cylinder.

* * * * *